United States Patent [19]
Friedel

[11] 3,762,815
[45] Oct. 2, 1973

[54] CAMERA WITH ROTATABLE VACUUM EXPOSURE PLATE AND BEN DAY SCREEN

[75] Inventor: Murray Friedel, North Miami, Fla.
[73] Assignee: Visual Graphics Corporation, New York, N.Y.
[22] Filed: Oct. 18, 1971
[21] Appl. No.: 190,039

[52] U.S. Cl. .................................... 355/73, 355/76
[51] Int. Cl. ......................................... G03b 27/60
[58] Field of Search ................... 355/73, 76; 96/116

[56] References Cited
UNITED STATES PATENTS

| | | | |
|---|---|---|---|
| 3,359,879 | 12/1967 | Hamlin | 355/73 |
| 3,237,543 | 3/1966 | Hoffman | 355/73 |
| 2,532,585 | 12/1950 | Van Der Rohe et al. | 96/116 |
| 1,347,824 | 7/1920 | Pifer | 355/73 |
| 2,282,337 | 5/1942 | Mies et al. | 96/116 |
| 3,308,714 | 3/1967 | Friedel | 355/73 |

*Primary Examiner*—Samuel S. Matthews
*Assistant Examiner*—Russell E. Adams, Jr.
*Attorney*—Albert F. Kronman

[57] ABSTRACT

A light sensitive sheet is carried upon a vacuum platen within a camera. The platen is rotatably mounted on two trunions and swingable into either one of two positions for receiving direct or reflected focused light from a camera lens, The platen may also be rotated about a median axis for image reversal. Means are provided for the application or removal of a sheet of Ben Day material carried upon the camera platen without interrupting the vacuum.

6 Claims, 13 Drawing Figures

PATENTED OCT 2 1973 3,762,815
SHEET 1 OF 3
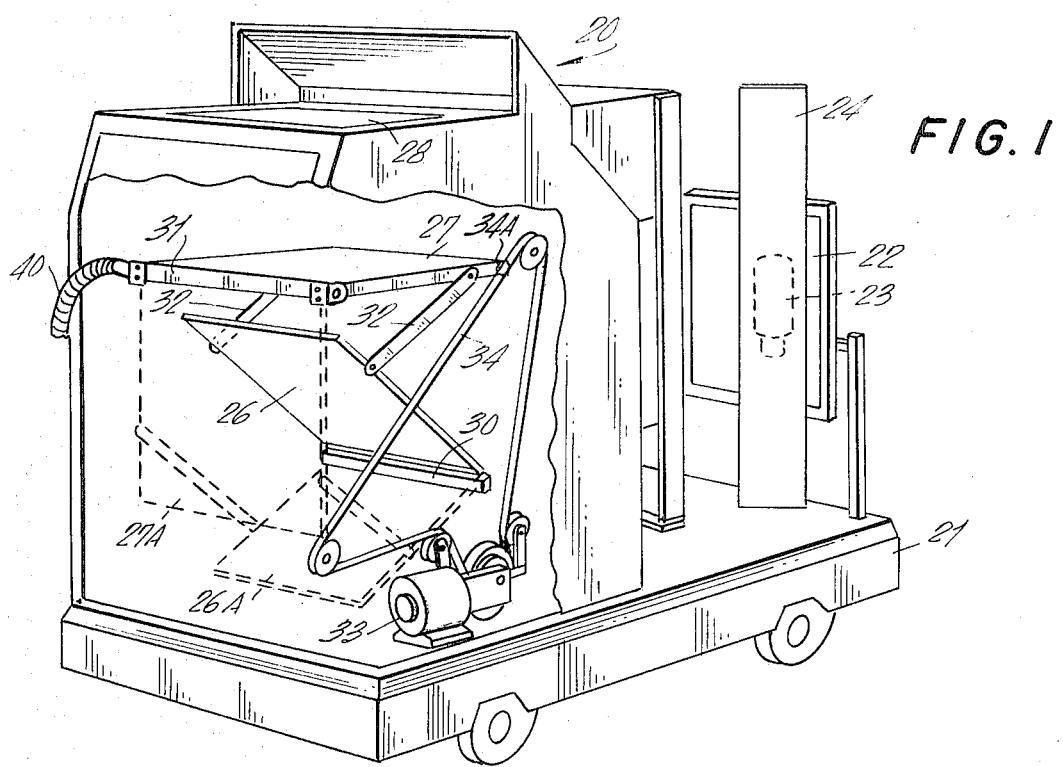
FIG. 1
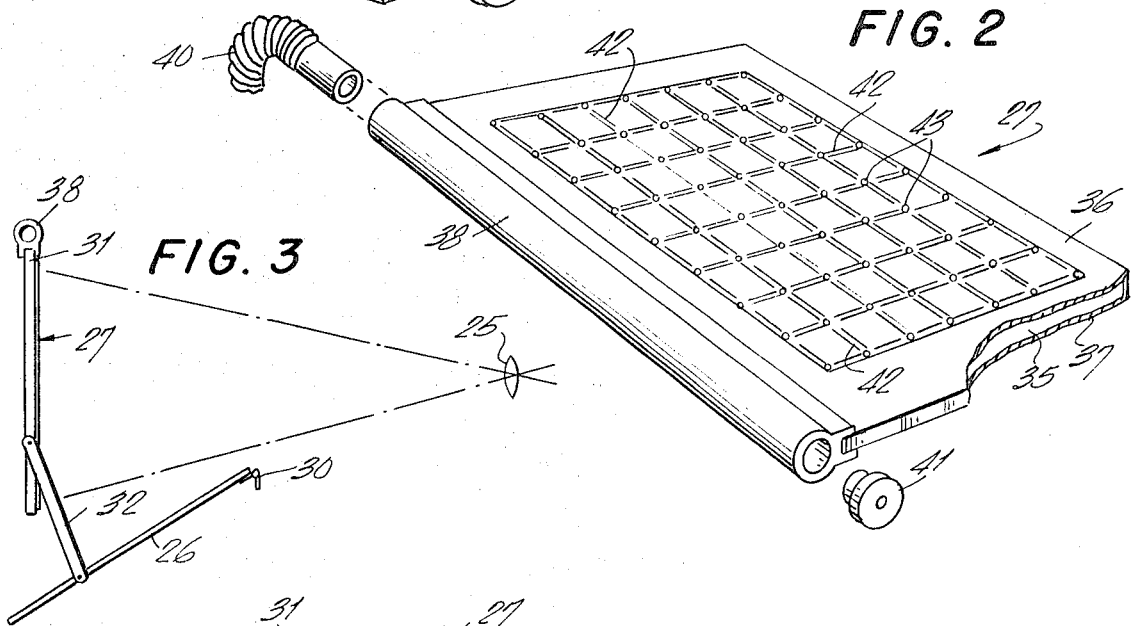
FIG. 2
FIG. 3
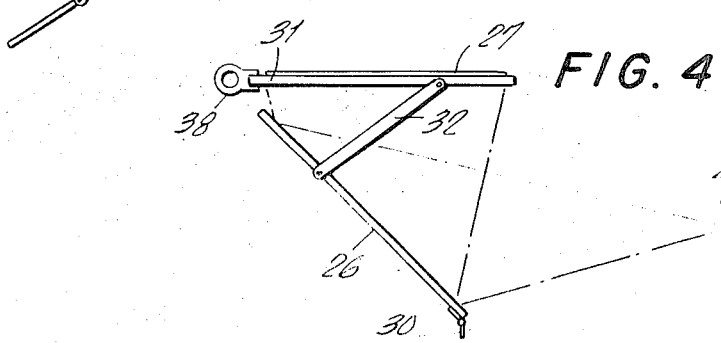
FIG. 4
INVENTOR.
MURRAY FRIEDEL
ATTORNEY PATENTED OCT 2 1973 3,762,815
SHEET 2 OF 3
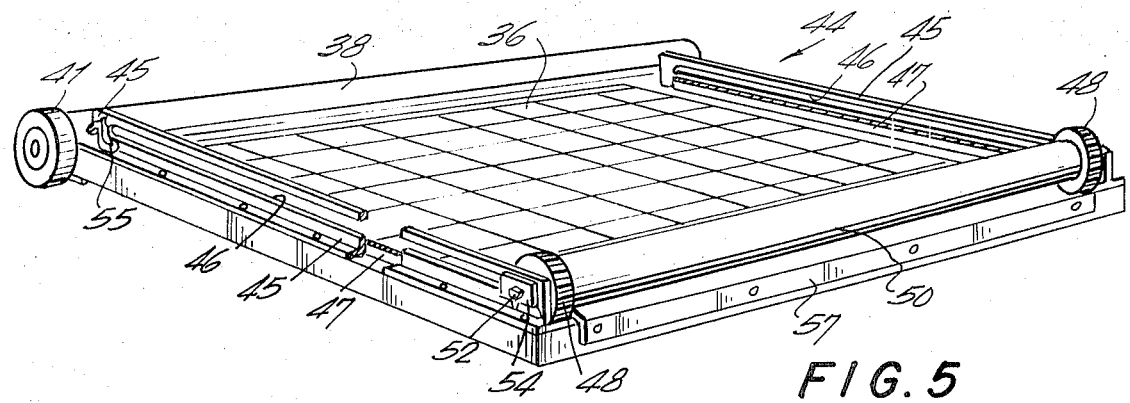
FIG. 5
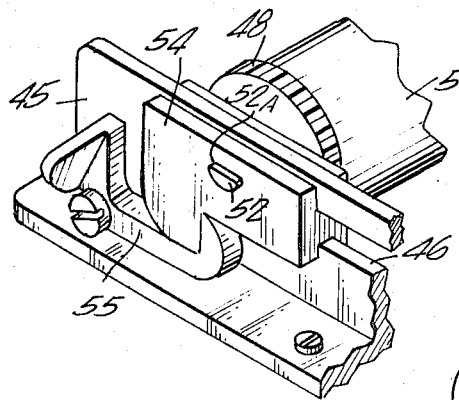
FIG. 7
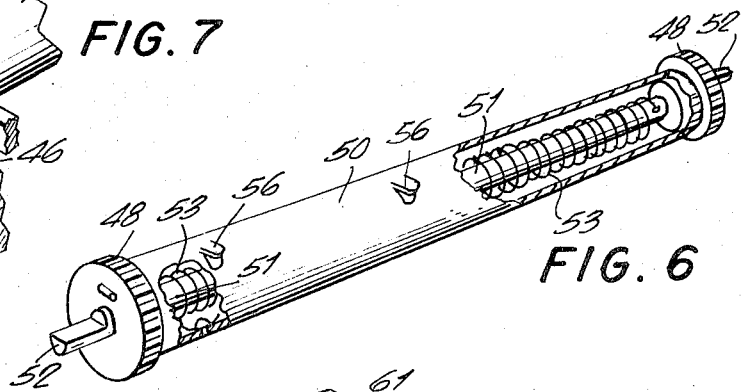
FIG. 6
FIG. 9
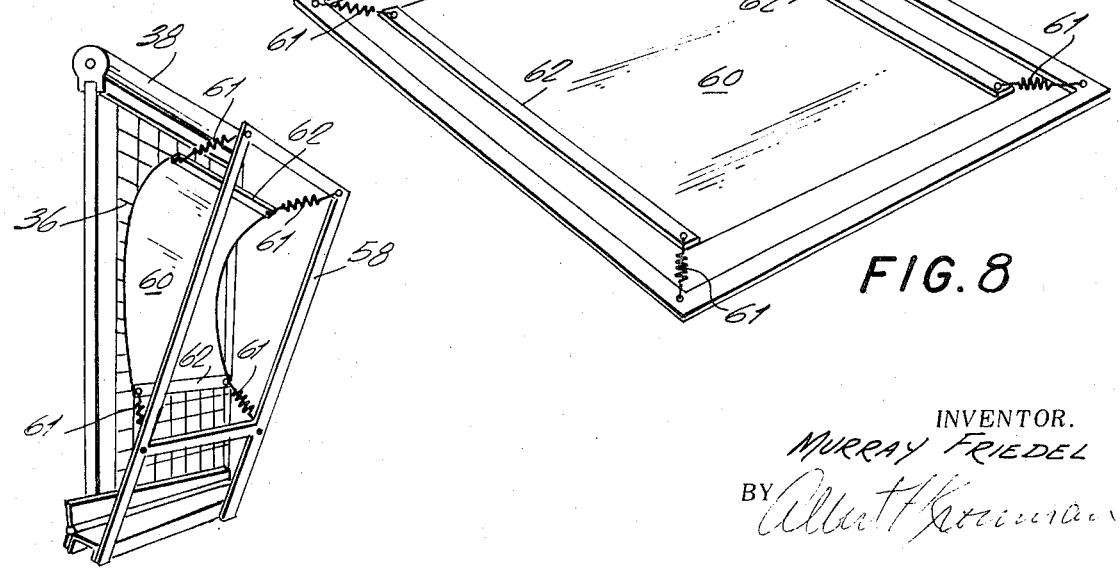
FIG. 8
INVENTOR.
MURRAY FRIEDEL
BY Albert Kronman
ATTORNEY PATENTED OCT 2 1973
3,762,815
SHEET 3 OF 3
FIG.10
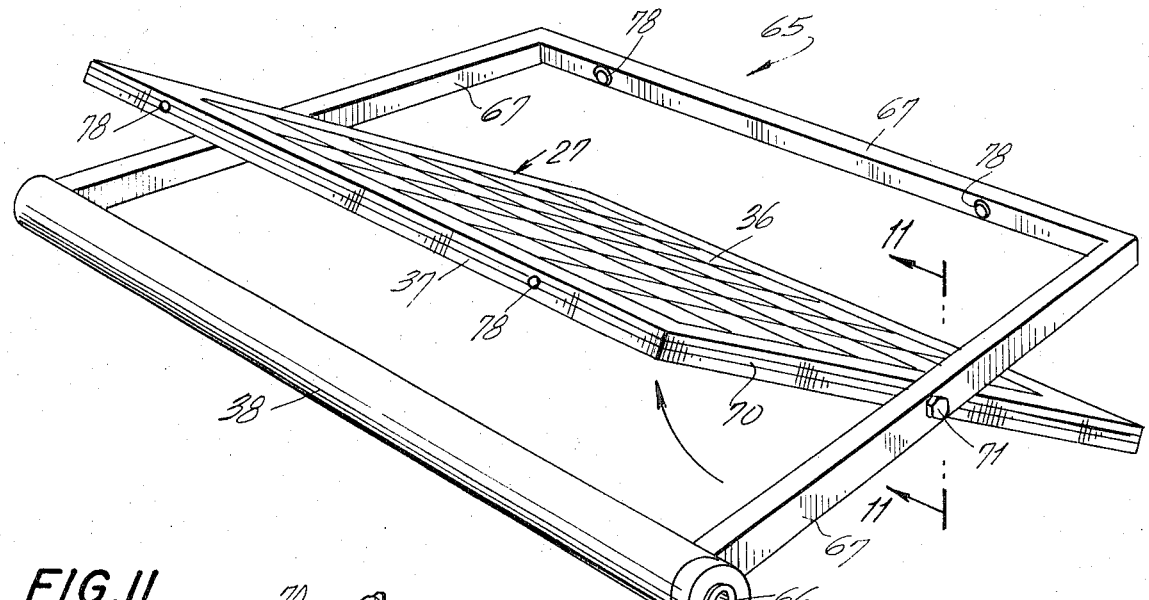
FIG.11
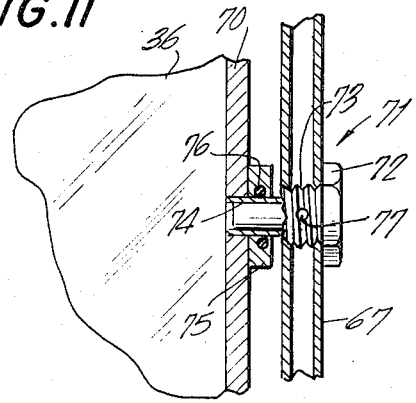
FIG.12
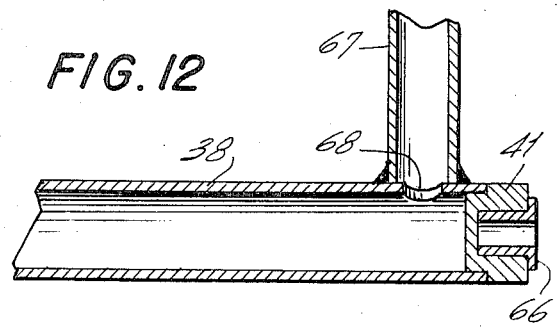
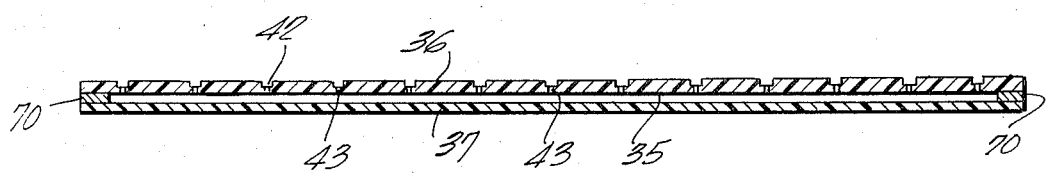
FIG.13
INVENTOR.
MURRAY FRIEDEL
BY
ATTORNEY

CAMERA WITH ROTATABLE VACUUM EXPOSURE PLATE AND BEN DAY SCREEN

BACKGROUND OF THE INVENTION

Cameras for photocopying, photoprinting, and lithography are well known as are the processes of using sensitized films therein. Generally, prior art cameras produced either wrong reading images or right reading images. Those which could be worked either way required a transparent sheet over the emulsion of the light sensitive sheet. The transparent sheet often caused "marked off" due to dust, finger prints, imperfections, etc. Also, considerable time is required to operate prior art equipment.

The present invention simplifies many photographic operations and uses only a single camera for all types of work.

A feature of the present invention is the manner of retaining a sheet of sensitized film on a platen which is positioned in the camera image plane.

Another feature of the present invention is the manner of applying a Ben Day film to the image platen without being touched by the operator.

Other features and details of the present invention will be disclosed in the following description taken in connection with the accompanying drawings.

BRIEF DESCRIPTION OF THE FIGURES

FIG. 1 is a perspective view of the camera with parts broken away to show the details of the image platen, FIG. 2 is an enlarged view of the image platen showing its hollow construction, FIG. 3 is a side view of the image platen in optical alignment with the objective lens, FIG. 4 is a side view of the image platen positioned at one side of the optical axis, receiving its focused light from a mirror, FIG. 5 is a perspective view of an alternate form of the image platen with a tubular housing enclosing a roll of a Ben Day screen, FIG. 6 is a view of the tubular housing with parts broken away to show its inner construction, FIG. 7 is a perspective view of the locking means for holding the tubular housing in place, FIG. 8 is a view of an alternate form of Ben Day screen holder including a frame, FIG. 9 is a perspective view of the image platen with the Ben Day screen being removed by the frame, FIG. 10 is a perspective view of an alternate form of image platen rotatably mounted on trunions, FIG. 11 is a cross sectional view of one of the trunion supports, FIG. 12 is a cross sectional view of one of the joints in the frame which holds the image platen shown in FIG. 10, FIG. 13 is a cross sectional view of the image platen showing the vacuum ports and channels.

DESCRIPTION OF THE PREFERRED EMBODIMENTS

Referring now to FIGS. 1, 3, and 4, the camera is housed in a light tight box 20 mounted on a base 21. The material to be photographed is placed on copy board 22 and illuminated by light sources 23 secured to a vertical panel 24. An object lens 25 (see FIGS. 3 and 4) focuses the light from the material on the board 22 and directs it first to a mirror 26 and then to an image platen 27. When the mirror 26 and platen are arranged in this position focusing can be done by viewing the image through a safe-glass plate 28 on top of the box 20. An exposure of a light sensitive sheet of paper or film can be made with the optical components in this position.

The mirror 26 is swingable about its lower edge where a hinge 30 secures the mirror edge to a partition in the box 20. The image platen is also swingable about its edge 31 and can be moved from the position shown in heavy lines to the vertical position 27a shown in dotted lines. Two flat links 32 act as coupling means between the mirror 26 and the image platen 27 so that a single lever or a motor can be used to move the members from one position to another.

FIG. 1 shows a reversible motor 33 with idler pulleys and a belt 34 for changing the positions of the mirror and platen.

The image platen 27 is shown in detail in FIG. 2 and includes substantially rigid spaced parallel sheets 36, 37 enclosing a hollow space 35. The sheets 36 and 37 are secured to a conduit 38 which also acts as a pivot means for the platen. The conduit is in communication with the hollow space 35 and to a flexible hose 40 for connection to a source of vacuum (not shown). A detachable plug 41 overlies one end of the conduit 38 to seal it from the atmosphere and to act as a pivot.

The upper and lower surfaces of platen 36 are formed with a grid of elongated grooves 42 with small holes 43 where the grooves cross. A sheet of light sensitive paper or a photographic film can be placed on either surface of the plate and will be held to the flat plate surface 36 by reason of the vacuum within the platen 27.

The platen 27 is coupled to the belt 34 as indicated at 34a. When the motor 33 is run in one direction the belt 34 swings the platen 27 from the position shown in FIG. 1 in full lines to that shown in FIG. 3. The mirror 26 will be swung out of the light path of the camera. Light sensitive material carried upon the top of the platen 27 will thus receive a wrong reading image of the original on the copy board 22. When the motor is reversed, the platen 27 and mirror 26 will be returned to the position shown in FIGS. 1 and 4. Light sensitive sheets held to the bottom of the platen 27 by the vacuum within the platen will receive the image reflected from the mirror 26. This image will be a right reading image. It will be apparent that the change from right reading to wrong reading exposure is accomplished in the present device without the necessity of the operator reaching into the camera to adjust it.

FIGS. 5, 6, and 7 show an alternate form of image platen 44 where the top sheet 36 has the same grooves 42 and small holes 43 as the top sheet shown in FIG. 2. On each side of the platen 44 a metal guide 45 is mounted, having an elongated slot 46 which extends for almost the entire length of the guide. Adjacent to each guide 45 there is mounted a rack 47 which meshes with a pinion gear 48 secured at each side of a hollow roller 50. When the hollow roller 50 is moved across the face of the image platen 36 the gears move together on the rack thereby preventing binding or skewing. An axial shaft 51 is mounted inside the hollow cylinder 50 and extends through the pinion gears 48. Each end of the shaft 51 is provided with a flattened portion 52. A long helical spring 53 is wound around the shaft 51 with one end secured to the shaft and the other end secured to the roller 50.

The shaft flats 52 are received within a complimentary hole 52a in a sliding plate 54 as shown in FIG. 7. Plate 54 rides in slot 46 and can be moved for the entire length of the image platen 36. At the pivot end of slot 46 a catch 55 is mounted so that the roller 50 and gears 48 may traverse the image platen 36 and be secured in its extended position against the return force of spring 53. A Ben Day screen (not shown) well known in the photographic and lithographic art is wound around the roller and anchored by attaching one end thereof to a plurality of cut out tabs 56 on the roller 50. The opposite, or outer end of the Ben Day screen is secured to one edge of the image platen 36 by means of a metal strip 57. When the Ben Day screen is to be used, the roller 50 is moved by hand to the other end of the platen 36 and the ends 54 are latched in position by catches 55. The light sensitive sheet is thus covered by the Ben Day screen and an exposure is made. The result is a half-tone or a shaded line drawing, depending upon the type of screen used. At the end of the exposure, the screen may be rolled up by releasing the latches 55. The spring 53 will roll up the screen without requiring the turning off of the vacuum source. The exposed sheet which is smaller than the screen will remain in place.

FIGS. 8 and 9 show another mounting for a Ben Day screen. A rigid wooden or metal frame 58 supports a screen 60 by means of four springs 61 attached to two transverse wooden strips 62. With this mount the screen can be accurately placed on the image platen 36 and, when the exposure is finished, the screen can be removed without the necessity of breaking the vacuum, by pulling on the frame and peeling the screen away from the platen. This removal technique is illustrated in FIG. 9 and can be accomplished without touching the screen.

A second alternate form of image platen 65 according to the present invention is illustrated in FIGS. 10, 11, 12, and 13. This form includes the above mentioned conduit 38 and plug 41 for forming a pivot means. The plug 41 may include a re-entrant cylindrical bushing 66 for mounting on a stub shaft. Secured to conduit 38 is a frame 67, at least one portion of which is hollow and in communication with both the interior of the conduit and platen 36. FIG. 12 is a cross sectional view showing how one leg of frame 67 is welded to conduit 38 surrounding a vacuum port 68.

The vacuum frame 27 shown in FIG. 10 has the above described clear plastic sheets 36 and 37 separated by a hollow space 35. The two sheets are sealed at their edges by spacer strips of metal 70 (see FIG. 13). One sheet 36 is formed with grooves 42 and small holes 43 through which air flows into the hollow space 35 when there is no sensitized paper or film applied to the sheet. Since in this form the image platen 65 is rotatable, a source of vacuum must be connected through trunions 71, to the hollow space 35 as shown in detail in FIG. 11. The trunion 71 includes a bolt having a head 72, a threaded portion 73, and a hollow pilot shaft 74. The pilot shaft extends through a washer 75 and the adjacent strip 70 which separates the two platen sheets 36 and 37. The washer 75 is welded to strip 70 to provide greater length of bearing surface and an O ring 76 is added to the inner surface of the washer to eliminate air leakage. Air is removed from the space 35 between sheets 36 and 37 through the hollow portion 74 and a hole 77 cut in the threaded portion 73 of the bolt. The air then moves through frame 67 to conduit 38 and then through flexible hose 40 to the vacuum source.

Image plate 65 can be turned manually so that the grooved sheet 36 is on the upper side or on the lower side. Spring loaded clips 78 are employed to retain the platen in the selected position during use.

In use, when the platen is horizontal as shown in full lines in FIG. 1, the rotatable plate 65 is turned so that its grooved sheet is up, then the light sensitive sheet is placed on the plate. Next, the image plate is rotated so that the sensitized sheet is down and the exposure is made. Many other combinations are possible since the entire image plate may be swung to a vertical position before the exposure is made as hereinabove described.

Having thus fully described the invention, what is claimed as new and desired to be secured by Letters Patent of the United States, is:

1. In a camera having a lens for focusing the light from an object onto an image plane, the improvement which comprises: an image platen having a surface positioned in the image plane said platen including two spaced sheets of substantially rigid material mounted in parallel relationship to form a confined space therebetween, a conduit forming one edge of said platen said platen being mounted in said camera to swing from a vertical to a horizontal position, means for connecting said conduit to a source of vacuum, a grid of elongated grooves on at least said surface of said image platen and holes in said grooves communicating with said confined space for the passage of air, whereby a sheet of sensitized material is held fast to the image platen during an exposure, and a mirror coupled to the platen to direct light from the lens upon the platen when the said platen is in the horizontal position.

2. A camera according to claim 1 wherein the platen and mirror are swung from one position to the other by belt means driven by a reversible motor.

3. A camera according to claim 1 wherein a roll of Ben Day sheet material is stored upon a roller at one edge of the image platen, one edge said sheet material is secured to the image platen, and means for moving the Ben Day sheet roller across the image platen whereby light sensitive sheet material on said platen may be exposed through the Ben Day sheet.

4. A camera according to claim 3 wherein said means for moving the Ben Day sheet includes spaced guides on opposite sides of the image platen, elongated slots in each of said guides, a rack adjacent to each slot, and a pinion gear in mesh with each rack secured to each end of the roller.

5. A camera according to claim 1 wherein a hollow rectangular frame is connected to the conduit and supports the image platen for rotation about a median axis, a pair of trunions secured to the frame and rotatably supporting the platen, at least one of said trunions containing hollow portions for transmitting the air in the image platen through the trunions and the frame to the rotatable conduit.

6. A camera according to claim 1 wherein a frame is swingably carried adjacent one edge of the platen and a Ben Day sheet is secured across said frame.

* * * * *